June 2, 1970  J. L. MIXON, JR., ET AL  3,516,050
TOOL AND EQUIPMENT TO CONNECT A LINE
ONTO A HIGH VOLTAGE LINE
Original Filed Oct. 29, 1964  8 Sheets-Sheet 4

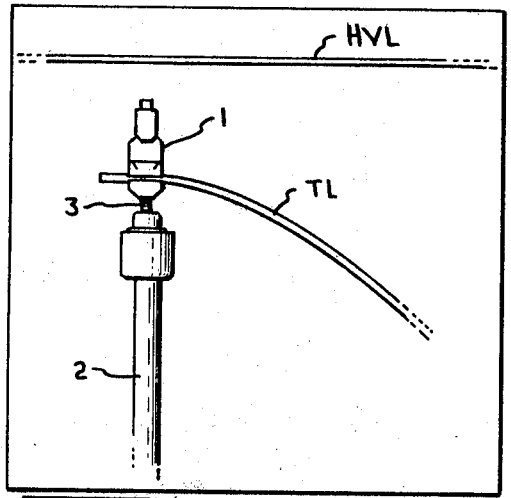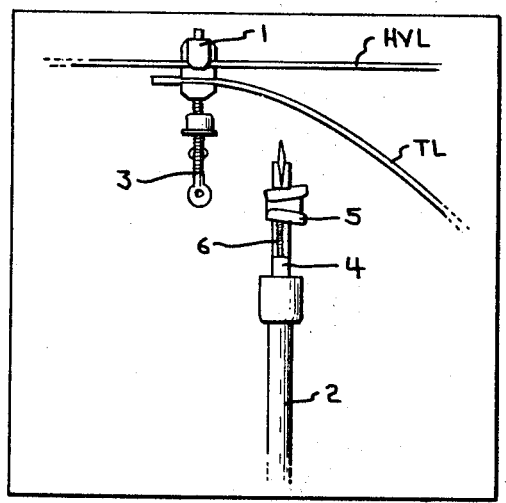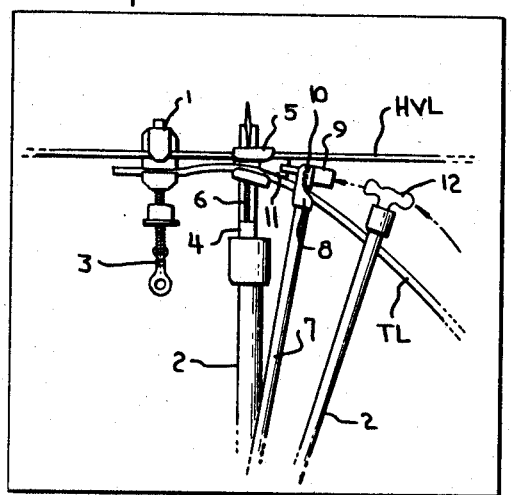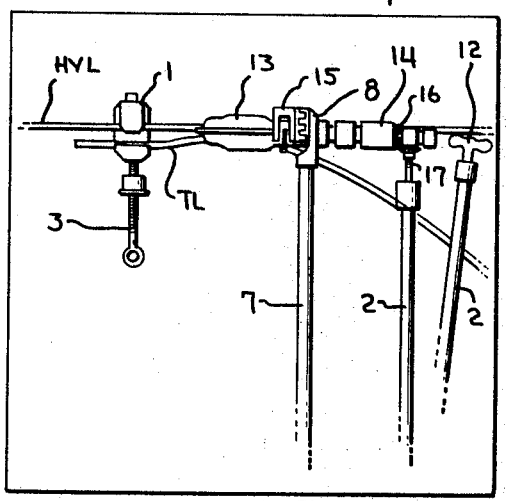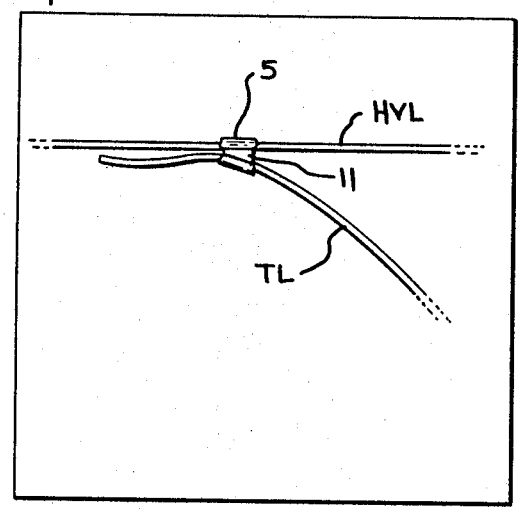

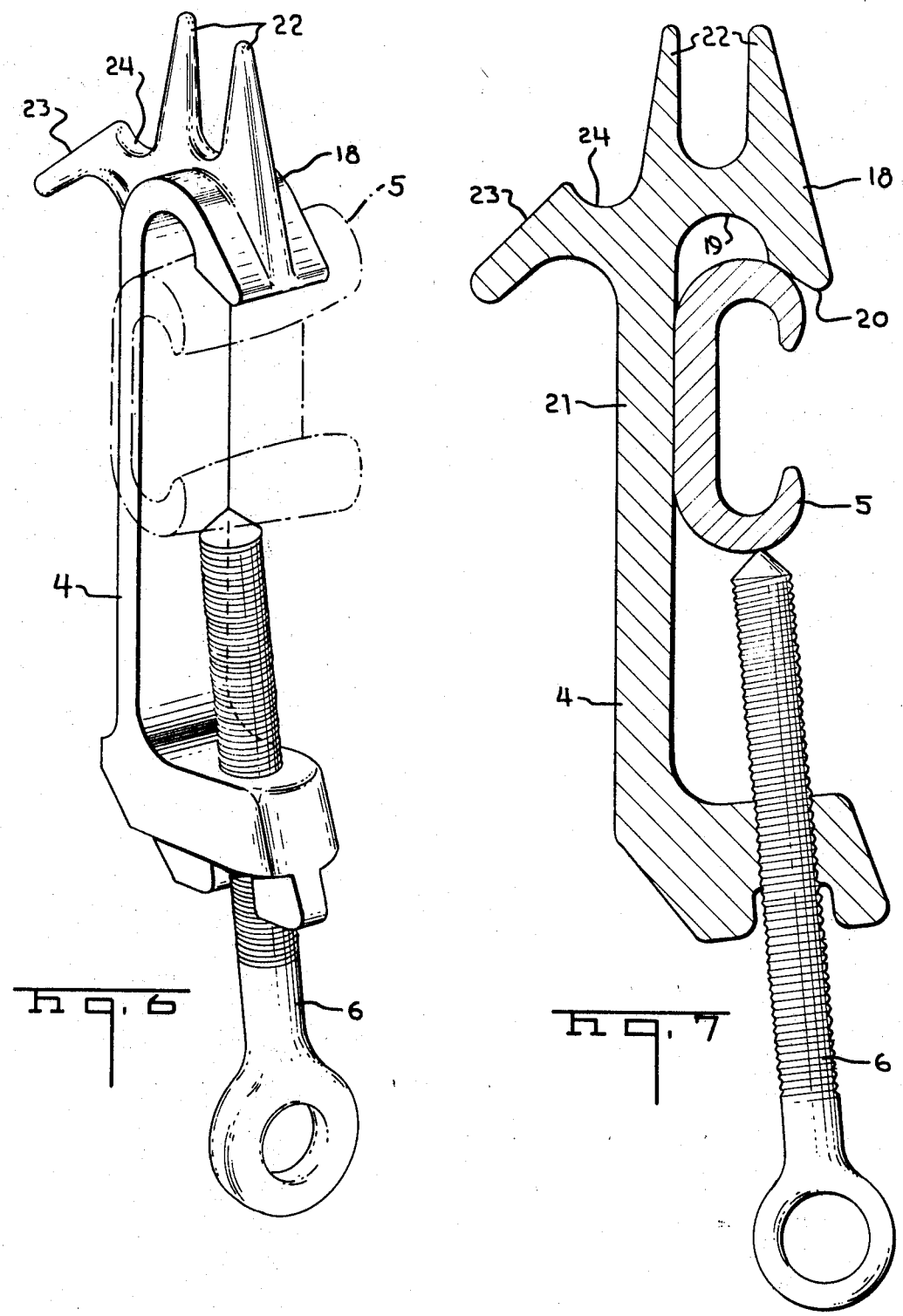

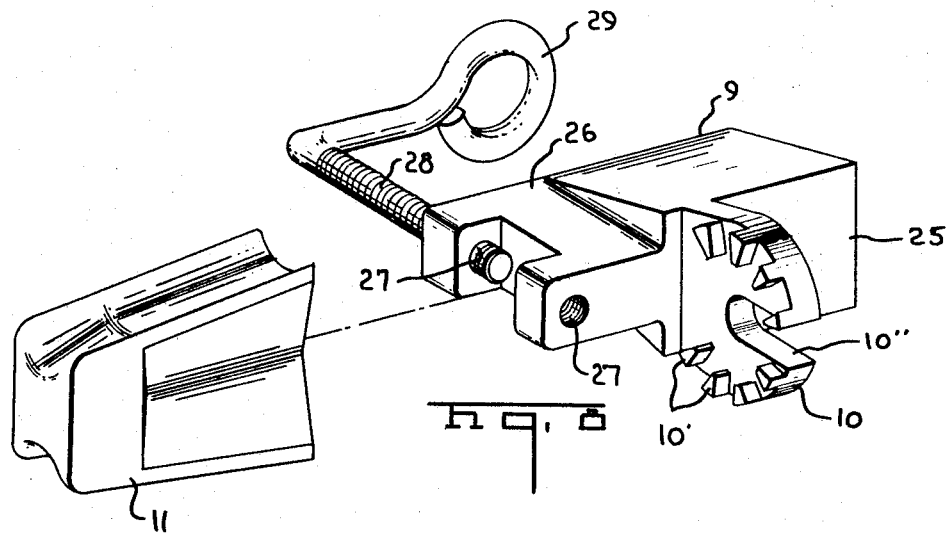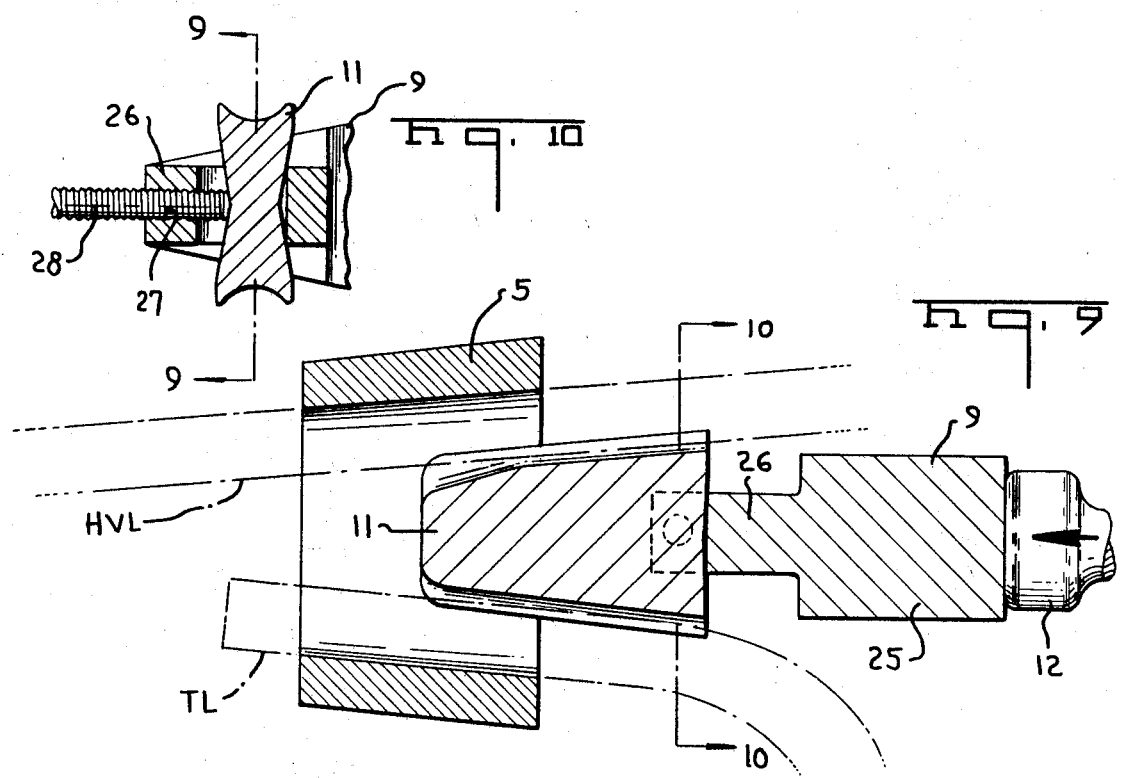

INVENTOR.
FREDERICK WILLIAM WAHL
JAMES LENHART MIXON JR.

June 2, 1970
J. L. MIXON, JR., ET AL
3,516,050
TOOL AND EQUIPMENT TO CONNECT A LINE ONTO A HIGH VOLTAGE LINE
Original Filed Oct. 29, 1964
8 Sheets-Sheet 5
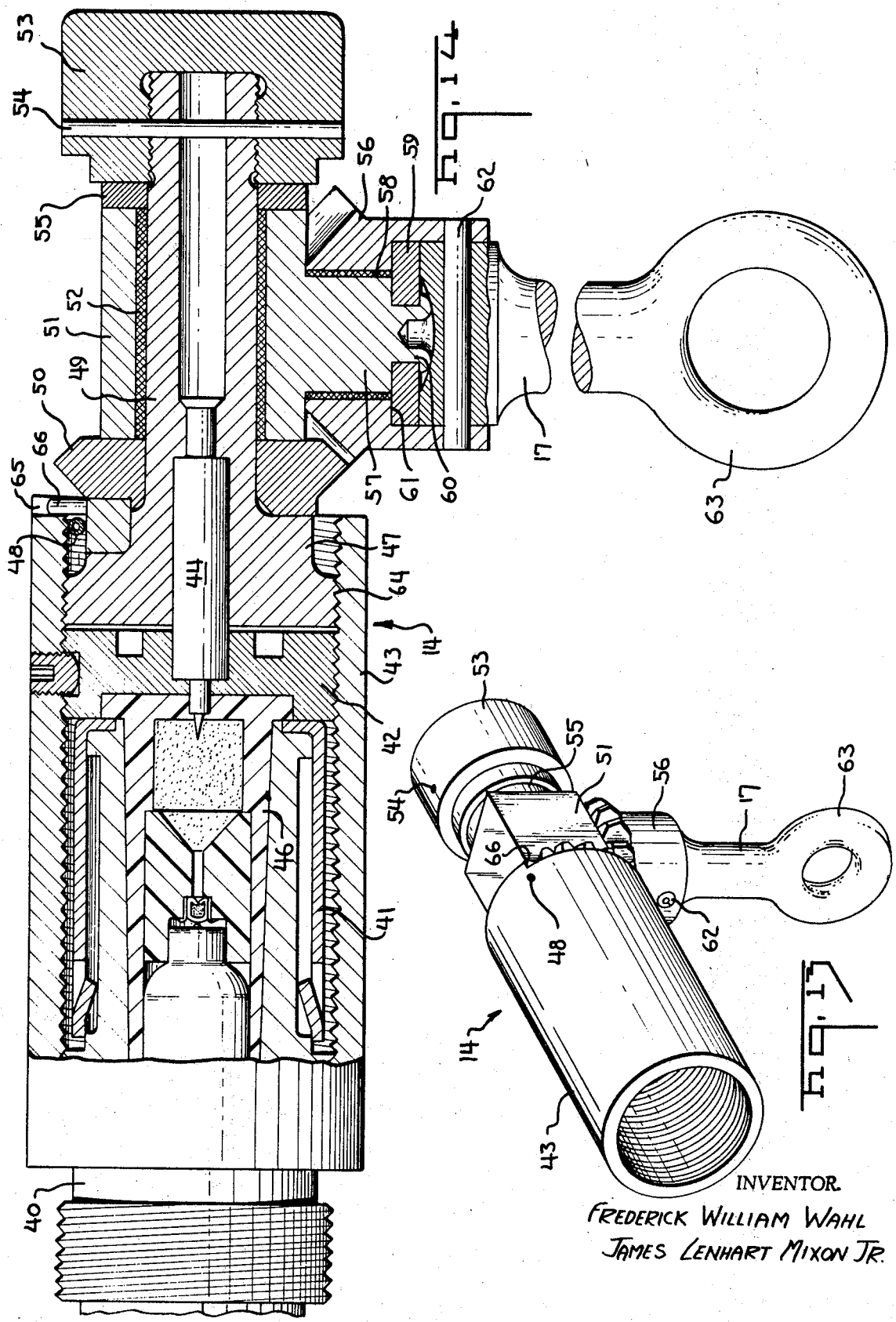
INVENTOR.
FREDERICK WILLIAM WAHL
JAMES LENHART MIXON JR.

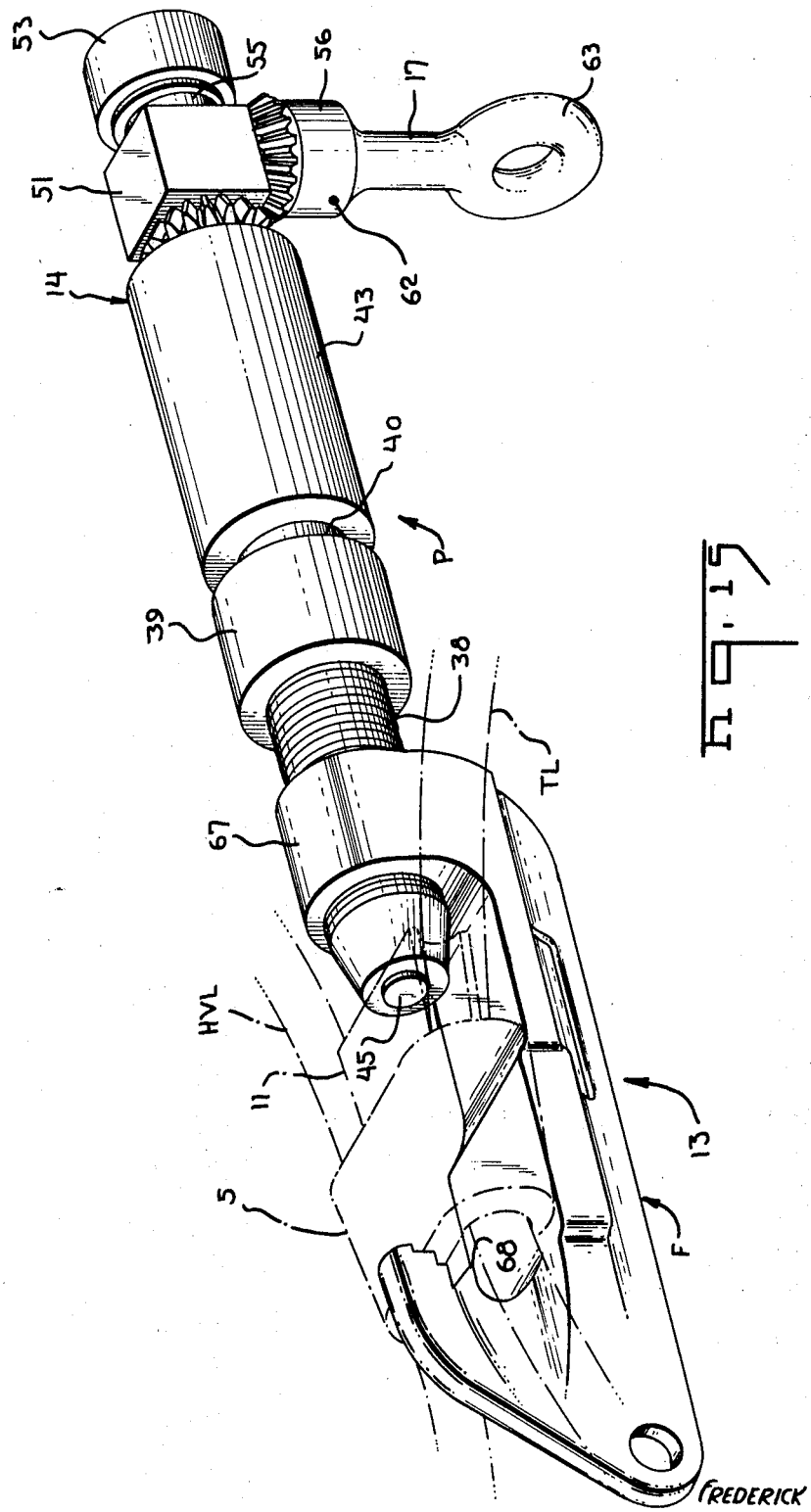

INVENTOR.
FREDERICK WILLIAM WAHL
JAMES LENHART MIXON JR.

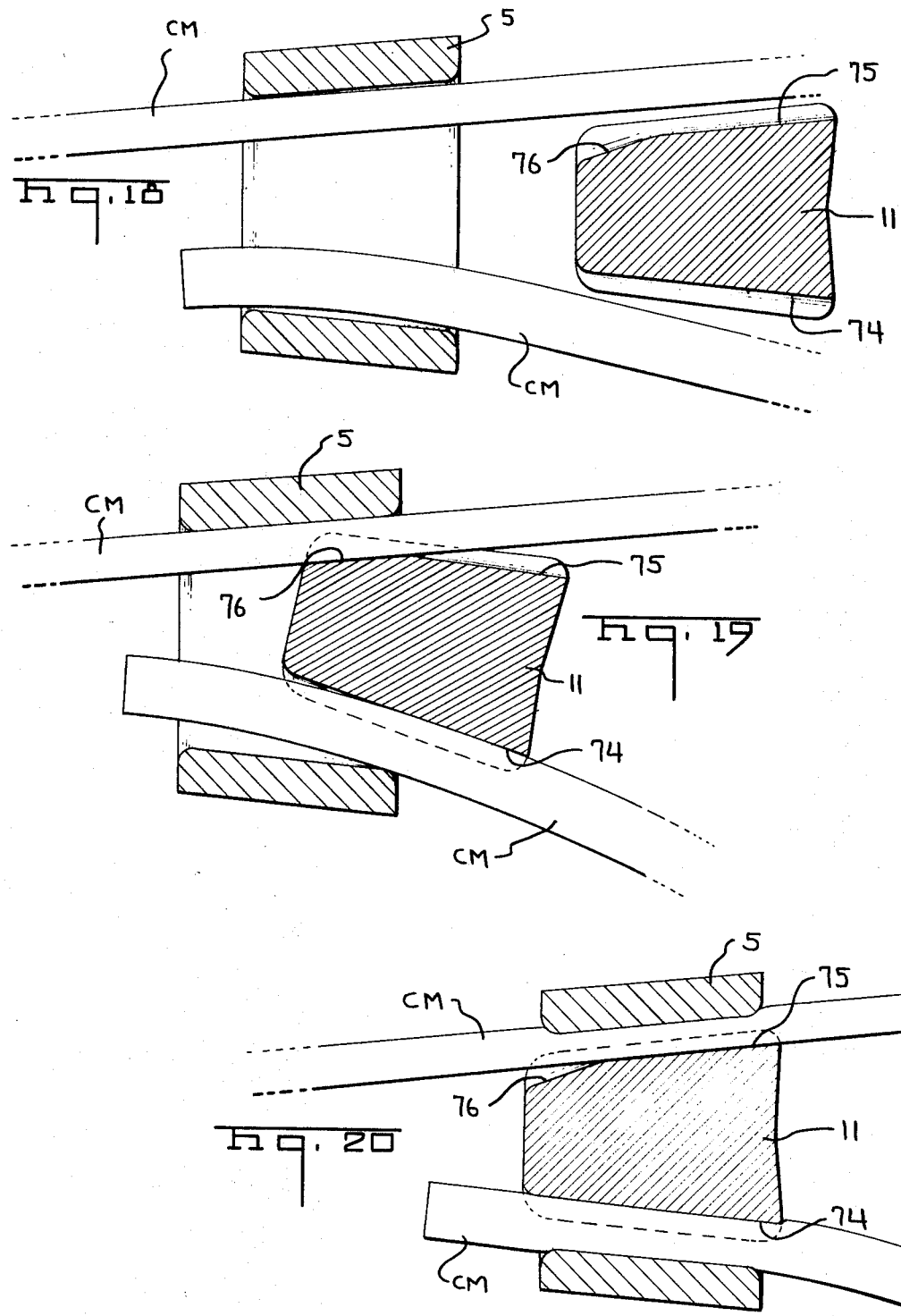

United States Patent Office 3,516,050
Patented June 2, 1970

3,516,050
TOOL AND EQUIPMENT TO CONNECT A LINE
ONTO A HIGH VOLTAGE LINE
James Lenhart Mixon, Jr., Harrisburg, and Frederick
William Wahl, Middletown, Pa., assignors to AMP
Incorporated, Harrisburg, Pa.
Original application Oct. 29, 1964, Ser. No. 407,510, now
Patent No. 3,349,167, dated Oct. 24, 1967. Divided
and this application May 24, 1967, Ser. No. 640,901
Int. Cl. H01r 7/06
U.S. Cl. 339—247                                     4 Claims

ABSTRACT OF THE DISCLOSURE

A method of applying an electrical connection assembly of a connector body and a wedge member to an existing energized utility line to connect a tap line thereto which includes clamping the tap line to the utility line, applying the connector body to the utility line and tap line, introducing the wedge member into the connector body between the utility line and tap line, and forcefully driving the wedge member into the connector body thereby effecting the electrical connection between the utility line and tap line. Apparatus is also disclosed to effect the connection.

---

This invention relates to a tool and equipment in conjunction therewith to connect a line onto a high voltage line.

This application is a division of application Ser. No. 407,510, filed Oct. 29, 1964 and now U.S. Pat. No. 3,349,167.

It is, therefore, a primary object of the present invention to provide hot line tool means of the explosively-operated variety for connecting a connector assembly onto high voltage conductor means.

Another object of the present invention is the method of applying a connector assembly onto a high voltage conductor means.

A further object of the present invention is to provide a breech-nut assembly for use on existing explosively-operated tool means.

A still further object of the present invention is the provision of a safety feature in the power unit of the explosively-operated tool means.

An additional object of the present invention is the provision of a novel wedge of the connector assembly to facilitate the introduction thereof into the C-shaped body member.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGS. 1–5 schematically illustrate the various steps involved in connecting a conductive means onto a high voltage conductive means;

FIG. 6 is a perspective view of the clamp means to hold the C-shaped body member of the connection assembly;

FIG. 7 is a cross-sectional view of FIG. 6;

FIG. 8 is an exploded perspective view of the wedge member and clamping means therefor;

FIG. 9 is a view taken along lines 9—9 of FIG. 10;

FIG. 10 is a view taken along lines 10—10 of FIG. 9;

FIG. 13 is a perspective view of the breech assembly for use on an existing explosively-operated tool;

FIG. 14 is a partial cross-sectional view of FIG. 13;

FIG. 15 is a perspective view of the explosively-operated tool;

FIGS. 18–20 are cross-sectional views of a new type wedge member in its preassembled condition, partially assembled condition and assembled condition in a C-shaped body member, respectively.

Figure 11:
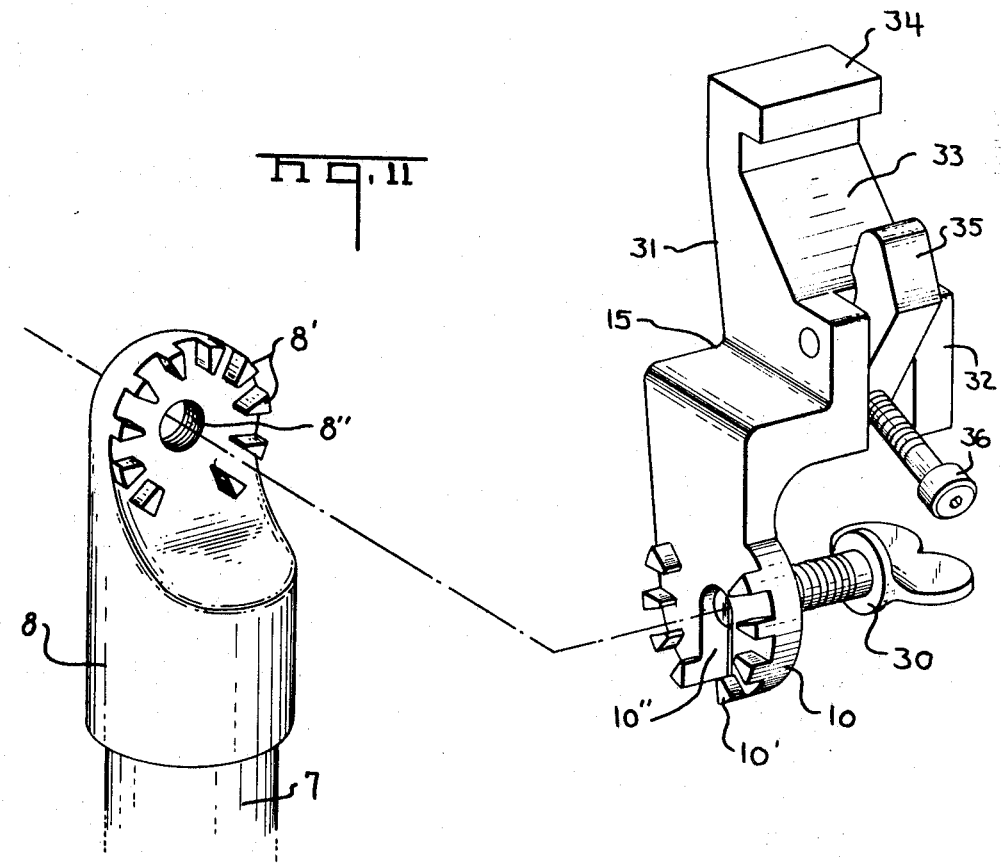
FIG. 11 is an exploded perspective view of a tool-clamping means and complementary handling stick.

Turning now to the drawings, and more particularly FIGS. 1–5, the method of connecting a tap line TL to a high voltage line HVL will be described. As shown in FIG. 1, a piggy-back clamp member 1 of conventional design has an end of tap line TL secured therein. A conventional grip-all clampstick 2 engages threaded member 3 of clamp 1, and clamp 1, with tap line TL secured thereto, is raised by clampstick 2 to the level of high voltage line HVL whereupon clamp 1 is engaged on the high voltage line and clampstick 2 is rotated thereby rotating screw thread member 3 to secure clamp 1 onto the high voltage line, as illustrated in FIG. 2. Clampstick 2 is then removed from the threaded member of clamp 1. Tap line TL is now temporarily secured to high voltage line HVL via clamp 1 and this is important since high voltage line is energized and has high voltage thereon.

A C-clamp member 4 has a C-shaped body member 5 of a connector assembly secured therein via threaded member 6. Clampstick 2 is engaged on member 6, and, via clampstick 2, C-clamp 4 and body member 5 secured therein are raised to the level of the tap line and high voltage line and the tap line and high voltage line are disposed in respective bights of C-shaped body member 5, as illustrated in FIG. 3.

Stick 7 having a universal head 8 on one end thereof is used next. A wedge member clamping means 9 is secured onto universal head 8 via a mating universal head 10. A wedge member 11 is secured in clamping means 9 and stick 7 along with clamping means 9 and wedge member 11 secured thereto are raised to the position so that wedge member 11 is introduced between high voltage line HVL and tap line TL at the entrance of C-shaped body member 5, as illustrated in FIG. 3. Clampstick 2, having a hammer member 12 thereon, is used to strike wedge member clamping means 9 in order to drive wedge member 11 partially within body member 5, as illustrated in FIG. 3. C-clamp 4 is removed from body member 5 and clamping means 9 is removed from wedge member 11.

The connector assembly comprising C-shaped body member 5 and wedge member 11 partially disposed therein is now ready to be completely assembled to secure tap line TL to high voltage line HVL via explosively-operated tool 13. Explosively-operated tool 13 is similar to that disclosed in the later-mentioned Pats. 3,292,363 and 3,296,792, except that the tool has a breech assembly 14 which is different from the breech assembly set forth in these applications and will be described in further detail hereinafter. Tool clamping means 15 has a universal head member which mates with universal head 8 of stick 7, which permits an operator to raise tool 13 into position to engage the connector assembly.

After tool 13 has been placed in position on the connector assembly, clampstick 2 is engaged with an operating member 17 of gear means 16 on breech assembly 14. Upon rotation of clampstick 2 in one direction, the power assembly of the tool is threadably moved within a frame of the tool until the end of the power assembly comes into engagement with wedge member 11. Breech assembly 14 is then struck with hammer member 12 which actuates the power assembly thereby driving a ram member disposed therein into engagement with wedge member 11 which drives same fully into C-shaped body member 5.

After wedge member 11 has been driven into C-shaped body member 5, as illustrated in FIG. 5, to effect an interconnection between tap line TL and high voltage line HVL, clampstick 2 is rotated in the opposite direction to release the explosive gases within the firing chamber of the power assembly and to move the power assembly outwardly from wedge member 11 so that tool 13 can be removed from the connector assembly via stick 7. Clamp 1 is removed from the tap line and high voltage line since these lines are now mechanically and electrically interconnected via the connector assembly and this clamp would be unnecessary equipment on these lines.

FIGS. 6 and 7 illustrate more clearly C-clamp 4. Leg 18 includes an inner radiused section 19 which merges with tapered surface 20. Section 19 and tapered surface 20 accommodate different sizes of body members 5 and, as can be discerned, the axis of member 6 is in alignment with the center of section 19 in order to engage a leg of body member 5, when it is disposed in section 19 or in engagement with tapered surface 20, as illustrated in FIG. 7. Thus, C-shaped body member 5 is securely held within C-clamp 4 by section 19, body portion 21 of clamp 4 and member 6 or by tapered surface 20, body portion 21 and member 6 in accordance with the size of body member 5. Spaced projections 22 extend outwardly from leg 18 and these are used to move lines out of the way or straighten lines or the like, when clamp 4 is engaged by clampstick 2, as illustrated in FIG. 2. A hook 23 extends outwardly from body portion 21 and leg 18 and is useful for hooking the clamp onto a line, when not in use. Hook 23 includes a radiused portion 24, the purpose of which will be described hereafter.

Turning now to FIGS. 8–10, there is illustrated wedge member clamping means 9, which includes a wedged-shaped section 25, a U-shaped section 26 extending outwardly therefrom and mating universal head 10. Holes 27 are located in the legs of U-shaped section 26 which receive a threaded member 28 having a ring-shaped section 29 disposed at right angles to the threaded section. Universal head 10 is adapted to mate with universal head 8 of stick 7 and lugs 10' of universal head 10 are adapted to mesh with lugs 8' of universal head 8 so that the universal heads can be disposed at angular dispositions with respect to one another. Universal head 8 has a threaded hole 8" disposed therein and universal head 10 has a slot 10" disposed therein. A wing nut 30, as illustrated in FIG. 11, extends through slot 10" and threadably engages threaded hole 8" when the universal heads are in engagement with one another and this wing nut secures them in their engaged position.

The largest end of wedge member 11 is disposed within the legs of section 26 and threaded member 28 is moved within one of threaded holes 27 until it locks the wedge member within U-shaped section 26, as illustrated in FIG. 10. Wedge-shaped section 25 defines a section against which hammer member 12 engages to drive wedge member 11 within body member 5 between tap line TL and high voltage line HVL disposed in the bight sections of body member 5, as illustrated in FIG. 9. After wedge member 11 has been partially driven within body member 5, it is frictionally held in this position by tap line TL and high voltage line HVL, therefore, clamping means 9 is no longer required. Hook 23 of clamp 4 is placed within ring-shaped section 29 of threaded member 28 and radiused portion 24 of hook 23 is utilized to loosen threaded member 28 so that clamping means 9 can be easily removed from wedge member 11.

Figure 12:
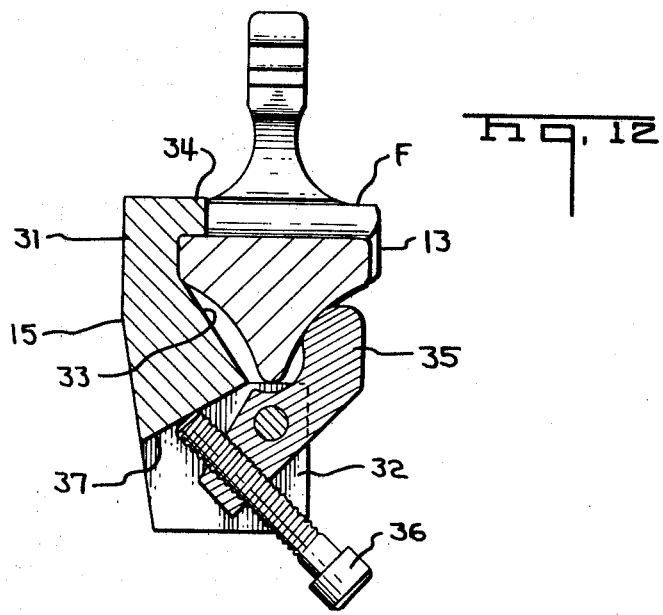
FIG. 12 is a cross-sectional view of the tool-holding means in position on a tool.

FIGS. 11 and 12 illustrate clamping means 15 which includes a mating universal head 10 similar to the one located on wedge member clamping means 9. Universal head 10 extends outwardly from block 31 which includes a bifurcated section 32, a tapered surface 33 extending outwardly from bifurcated section 32 and flange 34 extending outwardly over a portion of tapered surface 33. A lever 35 is pivotally mounted in bifurcated section 32 and includes a section facing tapered surface 33 and a section disposed within bifurcated section 32, as illustrated in FIG. 12. A bolt 36 is threadably disposed within the section of lever 35 disposed within bifurcated section 32 and the inner end of bolt 36 is adapted to engage inclined surface 37 and move lever 35 toward and away from tapered surface 33 in accordance with the rotation of bolt 36.

As illustrated in FIG. 12, tool clamping means 15 is clamped onto frame F of tool 13 with flange 34 engaging an upper surface of frame F and lever 35 engaging another surface of frame F which is underneath the upper surface against which flange 34 is in engagement. Upon rotation of bolt 36 in one direction, lever 35 secures tool 13 within clamping means 15 by forcing the upper surface against flange 34 and a side surface of frame F against the surface of clamping means 15 disposed between flange 34 and tapered surface 33, as illustrated in FIG. 12. Thus, tool clamping means 15 securely holds frame F of tool 13 therewithin.

Explosively-operated tool 13 is illustrated in FIGS. 13–15. Frame F is similar to the frame of the tool disclosed in Pats. 3,292,363 and 3,296,792 and, therefore, need not be described any further. The same is true with regard to externally-threaded coupling member 38, sleeve 39, breech member 40, cartridge-ejection means 41, plug 42, sleeve 43, pin 44 and ram 45. Cartridge 46 is of the type disclosed in U.S. patent application, Ser. No. 239,618, filed Nov. 23, 1962, now U.S. Pat. No. 3,173,369. Plug 47, carrying pin 44, is threadably mounted within sleeve 43 and is movable from a point adjacent plug 42 to engagement with pin 48 mounted in sleeve 43. Plug 47 has a shaft 49 extending outwardly therefrom. A beveled gear 50 is mounted on shaft 49 and is keyed to plug 47 for movement therewith. A block 51 is rotatably mounted on shaft 49 via bearing means 52 press-fitted within an aperture of block 51. A cap 53 is threadably mounted on the end of shaft 49 and a pin 54 extends through cap 53 in shaft 49 to secure them together. Cap 53 bottoms on the end of shaft 49 which aligns the holes thereof in which pin 54 is to be disposed as well as preventing cap 53 to move relative to shaft 49 when this cap is struck with a hammer member which, if cap 53 moved relative to shaft 49, the threads therebetween would have a tendency to become jammed thereby making it difficult to remove cap 53 from shaft 49, when desired. A washer 55 is disposed between block 51 and cap 53.

Another beveled gear 56 is rotatably mounted on an extension 57 of block 51 via bearing means 58 press-fitted thereto. Beveled gear 56 is in mesh with gear 50 and define gear means 15, FIG. 4. A washer 59 is disposed on a rivet section 60 of extension 57 and in engagement with an annular flange 61 of beveled gear 56. Rivet section 60 is peened over onto washer 59 to secure washer 59 and beveled gear 56 onto extension 57 for rotation relative thereto. An operating member 17 has one end secured to beveled gear 56 via pin 62 and the other end includes a ring 63. A slot 64 is located in plug 47 and the threaded area thereof to allow gases from cartridge 46 after it has been exploded to escape into the atmosphere. A surface 65 extends outwardly from the end of sleeve 43 adjacent pin 48 and this surface is engaged by a pin 66 extending outwardly from beveled gear 50, as illustrated in FIG. 14.

In operation, a cartridge 46 is placed within the chamber of breech member 40 and breech assembly 14 with plug 47 in its rearwardmost position is threadably mounted on breech member 40. After breech assembly 14 is mounted on breech member 40, operating member 17 is rotated which causes beveled gear 56 to rotate beveled gear 50, thereby moving plug 47 to its innermost position so that pin 44 penetrates the end of cartridge 46 and extends therewithin. In this position, pin 66 is in engagement with surface 65, thereby limiting the inner movement of plug 47 within sleeve 43.

Upon further rotation of operating member 17 in the same direction, pin 66 in bearing against surface 65 causes breech assembly 14, breech member 40 and coupling member 38 to be rotated within threaded section 67 of frame F until the end of coupling member 38 engages wedge member 11, as illustrated in FIG. 15. Upon cap 53 being struck by a hammer member, cartridge 46 is exploded in the manner disclosed in Pats. 3,292,363 and 3,296,792. Upon the actuation of cartridge 46, ram 45 drives wedge member 11 into body member 5 and against die 68 to secure wedge member 11 within body member 5 in the manner disclosed in U.S. patent application, Ser. No. 341,223, filed Jan. 30, 1964, and assigned to the present assignee.

After wedge member 11 has been driven into body member 5, operating member 17 is rotated in the opposite direction which moves plug 47 and pin 44 secured thereto in a direction toward pin 48 via beveled gears 56 and 50. As soon as pin 44 moves away from cartridge 46, the explosive gases contained within cartridge 46 pass through the hole made within the end of cartridge 46 via pin 44, through the opening in plug 42 in which pin 44 moves, into the area between plugs 42 and 47 and then through slot 65 to the atmosphere. Operating member 17 is turned until plug 47 engages pin 48 whereupon breech assembly 14, breech member 40, sleeve 39, coupling member 38 and ram 45 are moved away from the connector assembly through threaded section 68. This is necessary in order to move ram 45 away from the connector assembly so that tool 13 can be removed therefrom.

Figure 16:
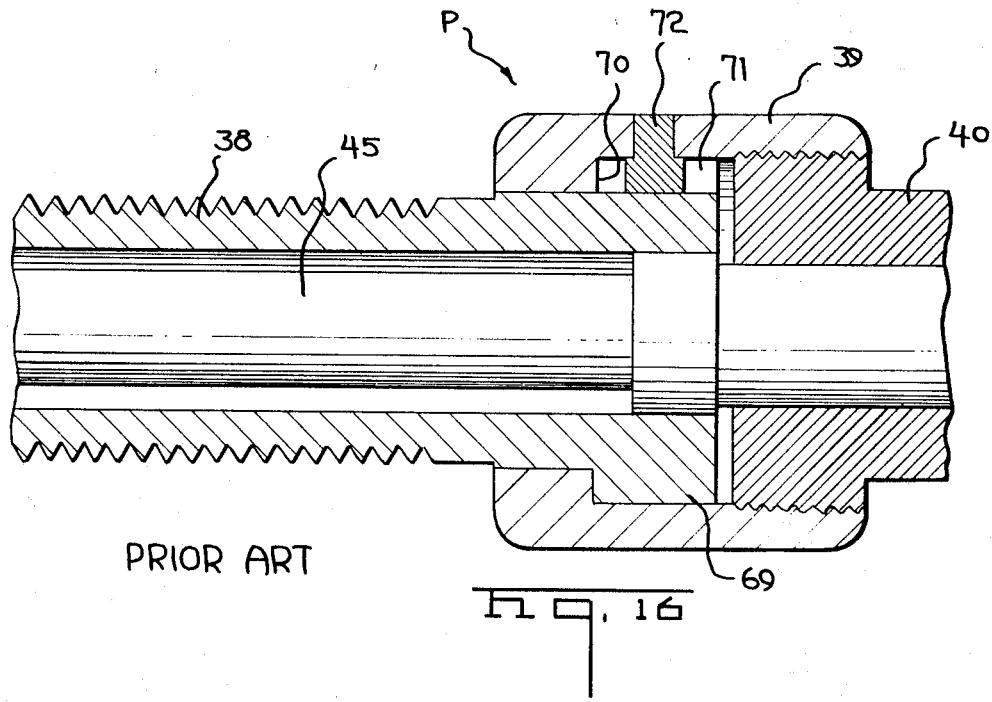
FIG. 16 is a cross-sectional view of part of a prior art power device.

In the power unit of the above-mentioned Pats. 3,292,363 and 3,296,792 as illustrated in FIG. 16, coupling member 38 has a flange 69 which abuts against a shoulder 70 of sleeve 39. Breech member 40 is threadably disposed within sleeve 39, and ram 45 is movably disposed in bores of coupling member 38 and breech member 40, as illustrated. A slot 71 is disposed in the outer surface of flange 69 and the head of a pin 72 disposed in sleeve 39 is disposed within slot 71 in order to prevent coupling member 38 from rotating relative to sleeve 39. After repeated use of the power unit, flange 69 is subjected to high impact and bending loads for a very short period of time. Thus, a failure of flange 69 would result in coupling member 38 moving free of sleeve 39 which could result in injury to an operator.

Figure 17:
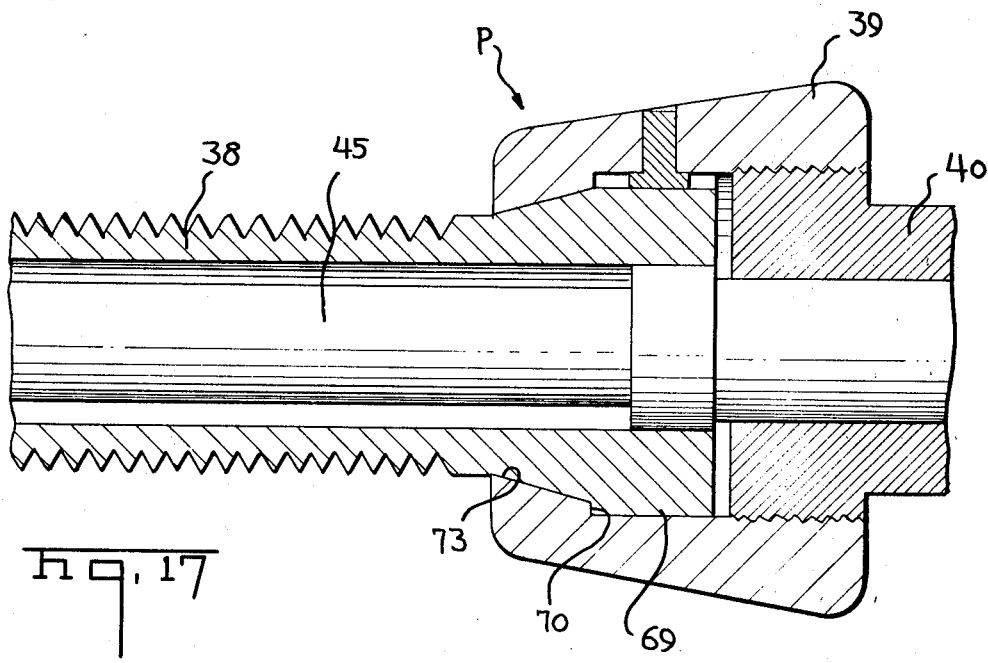
FIG. 17 is a cross-sectional view of part of a power unit having a safety feature.

In order to prevent coupling member 38 from moving out of sleeve 39 in the event that flange 69 fails, opening 73 of sleeve 39, through which coupling member 38 passes, is beveled and the part of coupling member 38 in engagement therewith has a mating beveled surface, as illustrated in FIG. 17. Thus, a failure of flange 69 would permit coupling members 38 to move slightly; however, the angle of beveled opening 73 would engage the corresponding beveled surface of coupling member 38 and stop this member from moving out of sleeve 39, thereby preventing injury to the operator. Because of the angle of beveled opening 73, tremendous force is exerted in the direction of the arrow causing beveled opening 73 to compress against the corresponding beveled surface of ram 45, thereby jamming the tool in order to prevent it from being used any further.

FIGS. 18–20 illustrate a novel concept with regard to wedge member 11 which has radiused sections 74 and 75 disposed in the inclined sides thereof. As can be discerned, radiused section 75 has at the smallest end of wedge member 11 another radiused section 76 which is inclined more than radiused section 75. Radiused sections 74 and 75 are formed so as to engage corresponding sizes of conductor members CM, i.e., the radius of section 74 and 75 corresponds to the radius of the conductor member to be disposed therein. Thus, if the conductor members are the same size, section 76 facilitates the insertion of wedge member 11 between conductor members CM when they are disposed within the bight sections of body member 5 prior to wedge member 11 being completely driven therewithin via a suitable driving tool.

With regard to the connection of a small conductor member and a large conductor member within body member 5, it has been found that transverse crimping forces usually compress the small conductor member to a greater degree than the large conductor member. This is due to the following reasons: (1) more cross-sectional area in the large conductor member; (2) greater force concentration on the smaller conductor member.

Due to the provision of radiused section 76 within radiused section 75, the transverse crimping forces take effect on a greater surface area of the large conductor member before they affect the small conductor members.

As shown in FIG. 18, wedge member 11 is placed between conductor members CM and in FIG. 19, wedge member 11 is placed into engagement with the conductor members such that section 76 engages the top conductor member and section 74 is in engagement with the bottom conductor member. Wedge member 11 is now ready to be driven completely within body member 5 via a suitable driving tool, such as, for example, explosively-operated tool 13 described hereinabove. FIG. 20 illustrates wedge member 11 completely driven within body member 5 with sections 74 and 75 in engagement with the conductor members to effect an excellent mechanical and electrical connection therebetween. Prior to wedge member 11 being driven within body member 5, it is disposed at an angular inclination with respect to the axis of body member 5, as illustrated in FIG. 19. During the travel of wedge member 11 within body member 5 (force from the power-operated tool) wedge member 11 rocks about the transition point between sections 75 and 76 and aligns itself during which time friction is reduced and forces are equalized onto the conductor members.

As can be discerned, there has been disclosed a unique method and tool means for connecting a connector assembly onto high voltage conductor means, a novel breech-nut assembly for use on existing explosively-operating tool means, the provision of a safety feature in the power unit of the explosively-operated tool means and a novel wedge member of the connector assembly.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A method of applying an electrical connector assembly including a body member and a wedge member onto an energized high voltage line to interconnect another line onto said high voltage line comprising the steps of clamping said other line onto said high voltage line, placing said connector body on said lines, introducing said wedge member into said body member and in engagement with said lines, and driving said wedge member into said body member to interconnect said lines.

2. A method of applying an electrical connector assembly including a body member and a wedge member onto an energized high voltage line to interconnect another line onto said high voltage line comprising the steps of clamping said other line onto said high voltage line, placing said connector body on said lines, introducing said wedge member into said body member and in engagement with said lines, applying a tool onto said connector assembly with a wedge-driving member in engagement with said wedge member, and driving said wedge-driving member to drive said wedge member into said body member to interconnect said lines.

3. In a method of applying an electrical connector assembly including a body member and a wedge member onto an energized high voltage line to interconnect another line onto said high voltage line, clamping said other line onto said high voltage line, and driving said wedge member into said body member after these members have been placed onto said lines to interconnect said lines.

4. A method of connecting a line to an energized high voltage line comprising the steps of clamping said line to said high voltage line, placing a body member on said lines, and driving a wedge member into said body member and along said lines therein to interconnect said lines.

References Cited
UNITED STATES PATENTS

| | | | |
|---|---|---|---|
| 1,801,277 | 4/1931 | Kelley | 339—247 |
| 2,107,061 | 2/1938 | Pittman et al. | |
| 2,235,274 | 3/1941 | Trehern. | |
| 2,966,817 | 1/1961 | Wengen | 339—264 X |
| 3,065,449 | 11/1962 | Matthysse et al. | 339—247 |
| 3,121,601 | 2/1964 | Toedtman | 339—265 |
| 3,177,459 | 4/1965 | Toedtman | 339—246 X |
| 3,275,974 | 9/1966 | Mixon. | |
| 3,280,856 | 10/1966 | Broske et al. | 339—247 X |
| 2,370,336 | 2/1945 | Wallace. | |
| 2,408,560 | 10/1946 | Keehn. | |

MARVIN A. CHAMPION, Primary Examiner

J. H. McGLYNN, Assistant Examiner

U.S. Cl. X.R.

24—123; 174—94; 287—83; 339—264, 273